(12) United States Patent
Barnebee et al.

(10) Patent No.: US 12,392,354 B2
(45) Date of Patent: Aug. 19, 2025

(54) BLOWER DEVICE

(71) Applicant: VALEO SYSTEMES THERMIQUES, La Verriere (FR)

(72) Inventors: Cody Barnebee, Auburn Hills, MI (US); Anshuman Shevade, Chennai (IN); Steven Marshall, Auburn Hills, MI (US); Timothy Mayer, Auburn Hills, MI (US)

(73) Assignee: Valeo Systemes Thermiques, La Verriere (FR)

( * ) Notice: Subject to any disclaimer, the term of this patent is extended or adjusted under 35 U.S.C. 154(b) by 20 days.

(21) Appl. No.: 18/540,001

(22) Filed: Dec. 14, 2023

(65) Prior Publication Data

US 2025/0198420 A1    Jun. 19, 2025

(51) Int. Cl.
*F04D 29/44*    (2006.01)
*F04D 29/28*    (2006.01)
*F04D 29/30*    (2006.01)

(52) U.S. Cl.
CPC .......... *F04D 29/282* (2013.01); *F04D 29/30* (2013.01); *F04D 29/441* (2013.01)

(58) Field of Classification Search
CPC ....... F04D 29/282; F04D 29/30; F04D 29/441
See application file for complete search history.

(56) References Cited

U.S. PATENT DOCUMENTS 6,092,988 A * 7/2000 Botros ............... F04D 29/667
                                              415/206
2008/0187439 A1 * 8/2008 Iyer .................. F04D 29/441
                                              415/206
2018/0080470 A1    3/2018 Koga et al.
2020/0408216 A1   12/2020 Zhang et al.
2021/0340995 A1   11/2021 Brisenheim

FOREIGN PATENT DOCUMENTS

JP   H05 195998 A    8/1993
JP   H07 305696 A   11/1995

OTHER PUBLICATIONS

European Patent Office, International Search Report and Written Opinion of corresponding PCT Application No. PCT/EP2024/060146, dated Mar. 12, 2025, 11 pages.

* cited by examiner

*Primary Examiner* — Sabbir Hasan
(74) *Attorney, Agent, or Firm* — Valeo Systemes Thermiques

(57) ABSTRACT

A blower device for a heating, ventilation and air conditioning system, including: a blower housing defining an internal volume with an inlet and an outlet; a blower wheel with blower blades, arranged within the internal volume of the blower housing; a motor configured to rotate the blower wheel in a first direction around a central axis; a preswirler arranged within the inlet upstream of the blower wheel and including a plurality of vanes extending towards the blower wheel. Each vane of the plurality of vanes includes a first section and a second section, both extending along the central axis toward the blower wheel, with the second section being closer to the blower wheel than the first section is. The vanes of the plurality of vanes slope in a second direction as they extend along the central axis towards the blower wheel, the second direction being opposite to the first direction.

19 Claims, 4 Drawing Sheets

BLOWER DEVICE

TECHNICAL FIELD

The invention relates to the field of ventilation, heating and/or air conditioning installations, in particular for a motor vehicle. The invention relates in particular to a blower device for such an installation.

BACKGROUND OF THE INVENTION

Heating and/or ventilation and/or air conditioning (or HVAC) installations for a motor vehicle make it possible to distribute air in a vehicle interior and generally include an air duct in which there are arranged various means for heat treatment of the air. The means for heat treatment of the air are in particular heat exchangers, for heating and/or cooling, for example an air-heating radiator and an evaporator intended to cool the air.

The airflow circulating in the heating and/or ventilation and/or air conditioning installation is generated by a motor-fan unit, also called a blower device or air blower, which is mounted at the level of a blower housing of the installation, which channels the airflow. The airflow is directed, via the blower device, to one or more outlets of the installation opening into the passenger compartment, after having been heat-treated.

SUMMARY OF THE INVENTION

The object of the invention is a blower device for a heating, ventilation and air conditioning system, comprising: a blower housing defining an internal volume with an inlet and an outlet; a blower wheel with blower blades, arranged within the internal volume of the blower housing; a motor configured to rotate the blower wheel in a first direction around a central axis; a preswirler arranged within the inlet upstream of the blower wheel and including a plurality of vanes extending towards the blower wheel; wherein each vane of the plurality of vanes includes a first section and a second section, both extending along the central axis toward the blower wheel, with the second section being closer to the blower wheel than the first section is, wherein the vanes of the plurality of vanes slope in a second direction as they extend along the central axis towards the blower wheel, the second direction being opposite to the first direction.

In one example, the first section extends parallel to the central axis.

In one example, the second section extends along a curve.

In one example, the second section extends along an arch with radius between 10 and 20 mm.

In one example, the number of blower blades is uneven.

In one example, the number of vanes within the plurality of vanes is uneven.

In one example, the number of blower blades is between 5 and 41.

In one example, the number of vanes within the plurality of vanes is between 5 and 19.

In one example, the preswirler includes a core from which the vanes of the plurality of vanes radially extend, the core being hollowed so that air from the inlet can travel through the core to the blower wheel in addition to flowing around the core.

In one example, the core is a tube with a radius measuring between 10 and 40 mm degrees.

In one example, the inlet is constituted by a wall, with the vanes of the plurality of vanes extending from the wall.

In one example, the first section of each vane of the plurality of vanes extends along the central axis for a distance measuring between 1 and 35 mm.

In one example, the second section of each vane of the plurality of vanes extends along the central axis for a distance measuring between 1 and 45 mm.

In one example, the second section of each vane of the plurality of vanes extends perpendicularly from the central axis for a distance measuring between 1 and 15 mm.

In one example, each vane of the plurality of vanes extends along respective extension axis extending radially from central axis for a distance measuring between 20 and 100 mm.

In one example, the blower wheel includes blower core from which the blower blades extend.

In one example, the blower core is in form of a cone with an apex pierced by the central axis, and a side surface extending between the apex and the blower blades.

In one example, each vane of the plurality of vanes measures between X and Y along the central axis.

In one example, the blower blades extend for a distance along the central axis, the distance measuring between 30 and 85 mm.

BRIEF DESCRIPTION OF DRAWINGS

The present invention will be described in greater detail below with reference to the drawings. In the drawings.

DETAILED DESCRIPTION OF THE INVENTION

Example embodiments will now be described more fully with reference to the accompanying drawings.

Generally, when a range is discussed and a term "between" is used in the context of two named, boundary values, such range is to be understood as including the boundary values.

Figure 1:
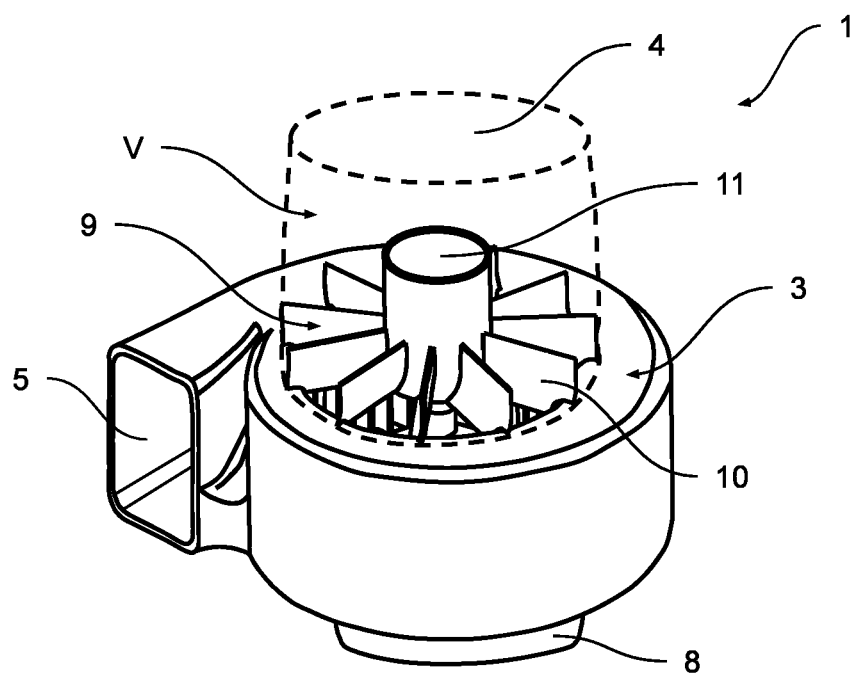
FIG. 1 shows a blower device in a perspective view.
Figure 2:
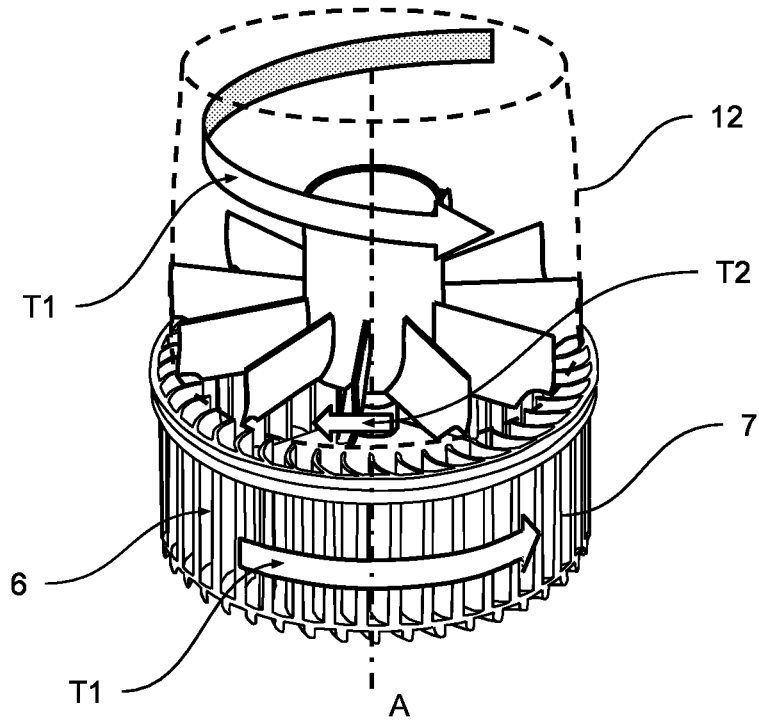
FIG. 2 shows a blower device according to the invention in a perspective view, with part of the housing removed.

FIGS. 1 and 2 show a blower device in a perspective view, with FIG. 2 having some elements removed for better clarity. A blower device 1 intended for a heating, ventilation and air conditioning system is shown. The blower device 1 comprises a blower housing 3 defining an internal volume V with an inlet 4 and an outlet 5. In other words, the blower housing 3 forms an air channel for the airflow between the inlet 4 and the outlet 5. The inlet 4 can be connected to upstream channels of the HVAC system, while the outlet 5 can be connected to the downstream channels of the HVAC system. The blower device 1 includes a blower wheel 6 with blower blades 7, arranged within the internal volume V of the blower housing 3. The blower device 1 further includes a motor 8 configured to rotate the blower wheel 6 in a first direction T1 around a central axis A. Rotation of the blower wheel 6, in particular of its blower blades 7, forces (ensures) the airflow between the inlet 4 and the outlet 5. The blower device 1 further includes a preswirler 9 arranged within the inlet 4 upstream of the blower wheel 6. The preswirler 9 includes a plurality of vanes 10 and is intended to influence the airflow going therethrough.

In particular, the vanes 10 of the plurality of vanes 10 slope in a second direction T2 as they extend along the central axis A towards the blower wheel 6, the second direction T2 being opposite to the first direction T1. Because of such arrangement, if the incoming air is already rotating in the direction of the blower wheel 6 rotation, that is the first direction T1, the preswirler 9 disrupts the prerotation, thereby for example allowing to better uniformly fill the blower blades 7 of the blower wheel 6. The counter swirling removes the in-direction preswirling, which would have naturally reduced the performance of the blower device 1. Otherwise, the initial swirl "with" the blower wheel 6 would reduce the relative speed and hence relative momentum change of the air to the blower wheel 6.

The first direction T1 can be clockwise, while the second direction T2 is counter-clockwise.

Alternatively, the first direction T1 can be counter-clockwise, while the second direction T2 is clockwise.

The preswirler 9 can include a core 11 from which the vanes 10 of the plurality of vanes 10 radially extend, the core 11 being hollowed so that air from the inlet 4 can travel through the core 11 to the blower wheel 6 in addition to flowing around the core 11.

In one example, the vanes 10 maintain their shape throughout their radial extension with respect to the central axis A.

In the shown example, the vanes 10 maintain their shape with their radial extension with respect to the central axis A as long as possible, in this case up to the point when they encounter reduced diameter of the inner air channel, where they merge into the housing 3 substantially perpendicularly.

The inlet 4 can constituted by a wall 12. The vanes 10 of the plurality of vanes 10 can extend from the wall 12. The vanes 10 of the plurality of vanes 10 can also or alternatively extend from the core 11.

Figure 3:
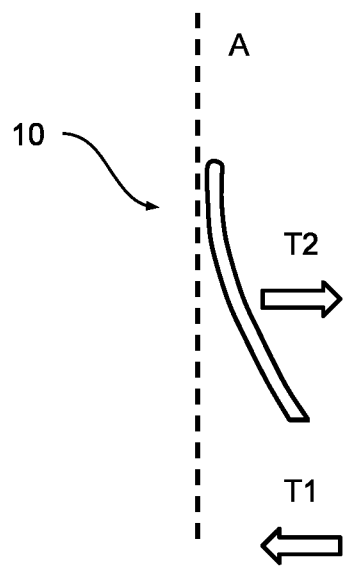
FIG. 3 shows an example of a preswirler vane in side view.

FIG. 3 shows an example of the preswirler vane 10 in side view, in particular a cross-section thereof showing its profile. The vanes 10 of the plurality of vanes 10 slope in a second direction T2 as they extend along the central axis A towards the blower wheel 6, the second direction T2 being opposite to the first direction T1.

Figure 4:
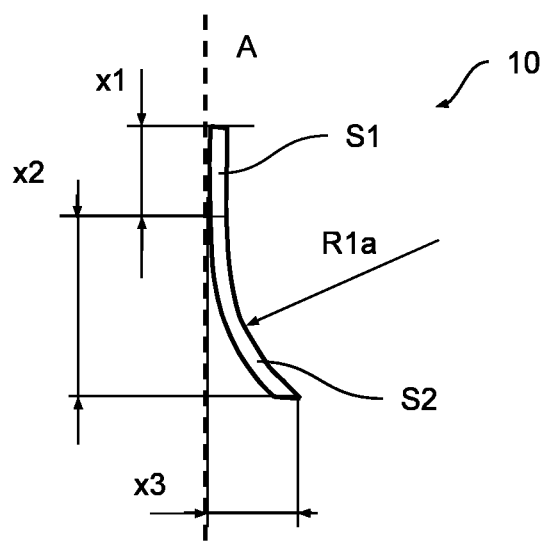
FIG. 4 shows another example of a preswirler vane in side view.

FIG. 4 shows another example of the preswirler vane 10 in side view. Each vane 10 of the plurality of vanes 10 includes a first section S1 and a second section S2, both extending along the central axis A toward the blower wheel 6, with the second section S2 being closer to the blower wheel 6 than the first section S1 is. The vanes 10 of the plurality of vanes 10 slope in a second direction T2 as they extend along the central axis A towards the blower wheel 6, the second direction T2 being opposite to the first direction T1.

The second section S2 can extend along a curve.

The second section S2 can extend along an arch with radius R1 between 10 and 20 mm. In one example, the second section S2 can extend along an arch with radius R1 measuring 14 mm.

The first section S1 of each vane 10 of the plurality of vanes 10 can extend along the central axis A for a distance x1 measuring between 1 and 35 mm. In one example, the first section S1 of each vane 10 of the plurality of vanes 10 can extend along the central axis A for a distance x1 measuring 10 mm.

The second section S2 of each vane 10 of the plurality of vanes 10 can extend along the central axis A for a distance x2 measuring between 1 and 45 mm. In one example, the second section S2 of each vane 10 of the plurality of vanes 10 can extend along the central axis A for a distance x2 measuring 15 mm.

The second section S2 of each vane 10 of the plurality of vanes 10 can extend perpendicularly from the central axis A for a distance x3 measuring between 1 and 15 mm. In one example, the second section S2 of each vane 10 of the plurality of vanes 10 can extend perpendicularly from the central axis A for a distance x3 measuring 7 mm.

Figure 5:
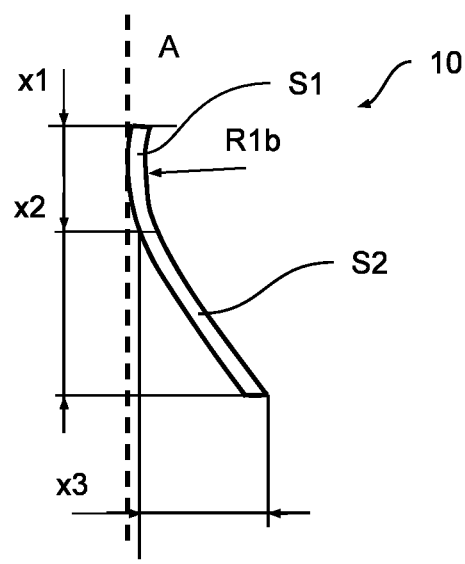
FIG. 5 shows another example of a preswirler vane in side view.

FIG. 5 shows another example of a preswirler vane 10 in side view.

Shows another example of the preswirler vane 10 in side view. Each vane 10 of the plurality of vanes 10 includes the first section S1 and the second section S2, both extending along the central axis A toward the blower wheel 6, with the second section S2 being closer to the blower wheel 6 than the first section S1 is. The vanes 10 of the plurality of vanes 10 slope in a second direction T2 as they extend along the central axis A towards the blower wheel 6, the second direction T2 being opposite to the first direction T1.

The first section S1 can extend along a curve.

The first section S1 can extend along an arch with radius R1$b$ measuring between 10 and 20 mm. In one example, the first section S1 can extend along an arch with radius R1$b$ measuring 14 mm.

The first section S1 of each vane 10 of the plurality of vanes 10 can extend along the central axis A for a distance x1 measuring between 1 and 35 mm. In one example, the first section S1 of each vane 10 of the plurality of vanes 10 can extend along the central axis A for a distance x1 measuring 10 mm.

The second section S2 of each vane 10 of the plurality of vanes 10 can extend along the central axis A for a distance x2 measuring between 1 and 45 mm. In one example, the second section S2 of each vane 10 of the plurality of vanes 10 can extend along the central axis A for a distance x2 measuring 15 mm. In the shown example, the second section S2 extends along a straight line.

The second section S2 of each vane 10 of the plurality of vanes 10 can extend perpendicularly from the central axis A for a distance x3 measuring between 1 and 15 mm. In one example, the second section S2 of each vane 10 of the plurality of vanes 10 can extend perpendicularly from the central axis A for a distance x3 measuring 7 mm.

In one example, not shown here, both the first sections S1 and the second section S2 extend along a straight line.

In another example, not shown here, both the first sections S1 and the second section S2 extend along respective curves, which can be common.

Figure 6:
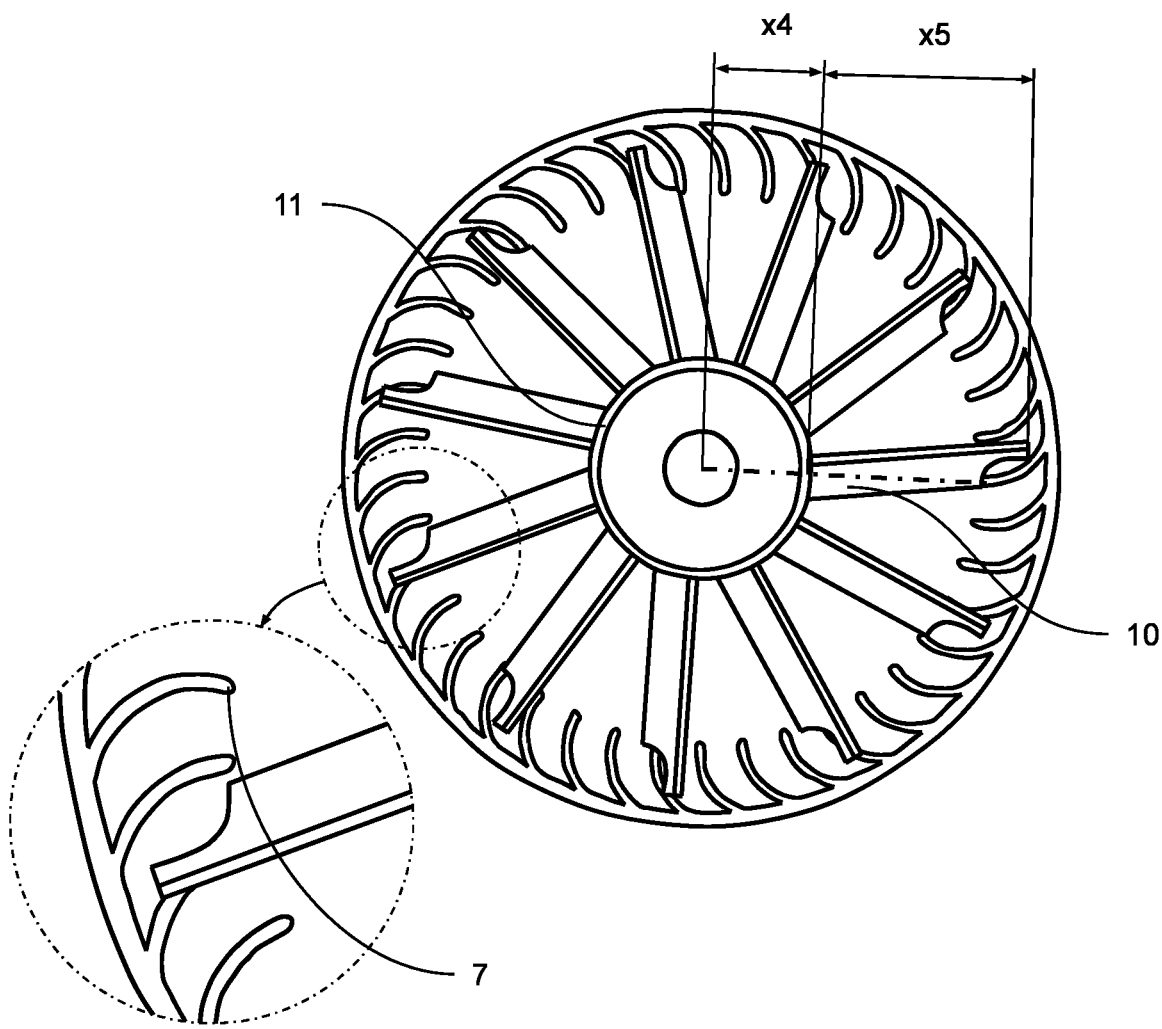
FIG. 6 shows a preswirler and blower wheel from above, with a partial detailed view of a portion thereof.

FIG. 6 shows a preswirler and blower wheel from above, with a partial detailed view of a portion thereof.

The number of blower blades 7 can be uneven.

The number of blower blades 7 can be between 5 and 41. In one example, the number of blower blades 7 is 41.

The number of vanes 10 within the plurality of vanes 10 can be uneven.

The number of vanes 10 within the plurality of vanes 10 can be between 5 and 19. In one example, the number of vanes 10 within the plurality of vanes 10 can be 11.

Each vane 10 of the plurality of vanes 10 can extend along respective extension axis extending radially from central axis A for a distance x5 measuring between 20 and 100 mm. In one example, each vane 10 of the plurality of vanes 10 can extend along respective extension axis extending radially from central axis A for a distance x5 measuring 42 mm.

The core 11 can be a tube with a radius x4 measuring between 10 and 40 mm. In one example, the core 11 can be a tube with a radius x4 measuring 21 mm.

Figure 7:
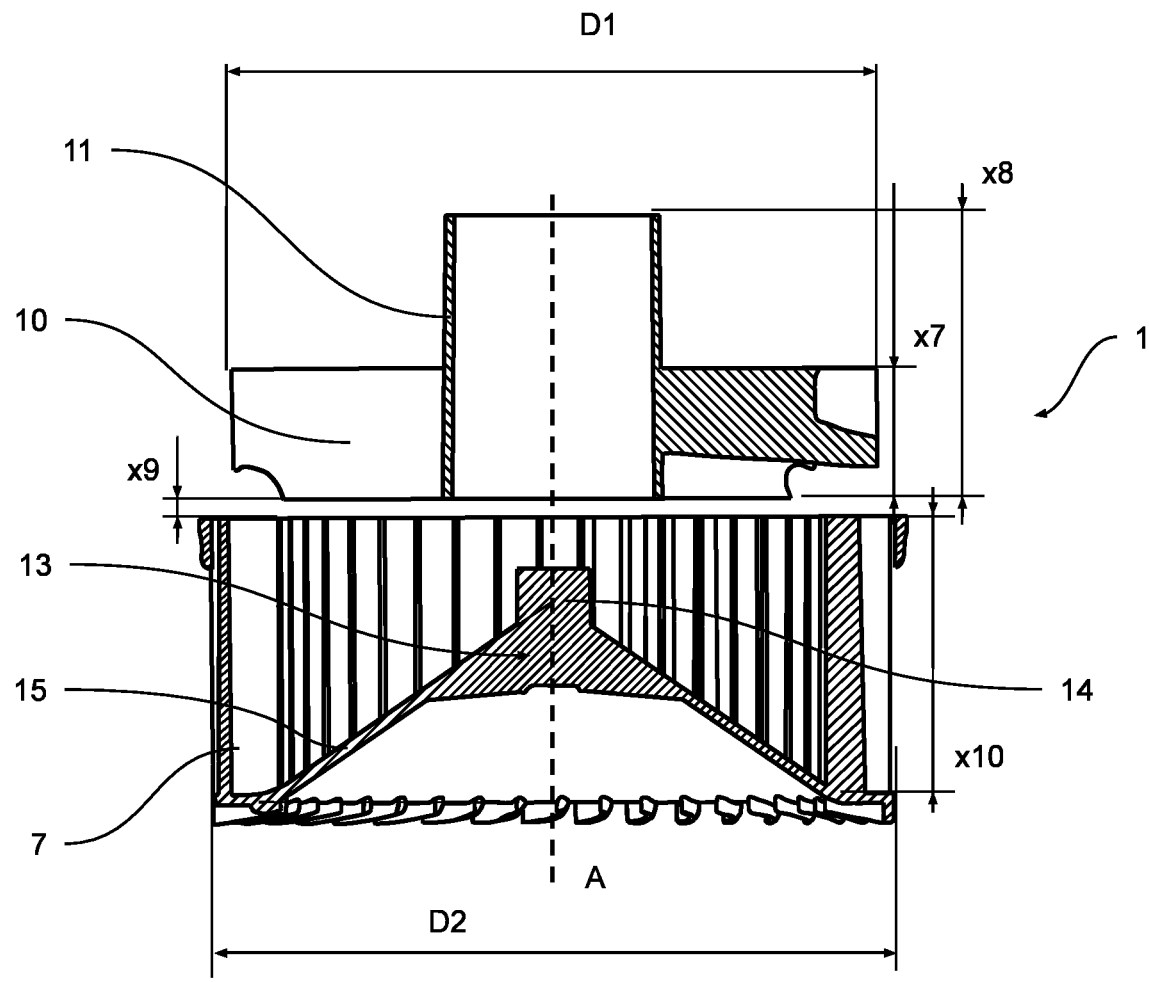
FIG. 7 shows a cross-sectional view of some elements of the blower device.

FIG. 7 shows a cross-sectional view of some elements of the blower device 1.

The blower wheel 6 can include blower core 13 from which the blower blades 7 extend. In one example, the blower blades 7 extend upwardly (upstream) from the blower core 13. The blower blades 7 can be then connected at their upper ends by a ring.

The blower core 13 can be in form of a cone with an apex 14 pierced by the central axis A, and a side surface 15 extending between the apex 14 and the blower blades 7.

Each vane 10 of the plurality of vanes 10 can measure between 10 and 50 mm along the central axis A. In one example, each vane 10 of the plurality of vanes 10 can measure between 25 mm along the central axis A.

The blower blades 7 can extend for a distance x10 along the central axis A, the distance x10 measuring between 30 and 85 mm. In one example, the blower blades 7 can extend for a distance x10 along the central axis A, the distance x10 measuring 70 mm.

The preswirler 9 can have an overall diameter D1 measuring between 60 and 170 mm. In one example, the preswirler 9 can have an overall diameter D1 measuring 127 mm.

The core 11 can extend for a distance x8 along the central axis A, the distance x8 measuring between 10 and 80 mm. In one example, the core 11 can extend for a distance x8 along the central axis A, the distance x8 measuring 55 mm.

The preswirler 9 can be distanced from the blower wheel 6 along the central axis by a distance x9 measuring between 3.5 and 6 mm. In one example, the preswirler 9 can be distanced from the blower wheel 6 along the central axis by a distance x9 measuring 3.5 mm.

The blower wheel 6 can have an overall diameter D2 measuring between 60 and 170 mm. In one example, the blower wheel 6 can have an overall diameter D2 measuring 140 mm.

The invention allows improving overall HVAC system performance by providing a significant pressure performance improvement, in particular when the air coming to the blower wheel 6 is already rotating due to geometry of the channel that precedes it. The invention allows to reduce the working point RPM (rotations per minute).

The invention claimed is:

1. A blower device for a heating, ventilation and air conditioning system, comprising:
   a blower housing defining an internal volume with an inlet and an outlet;
   a blower wheel with blower blades, arranged within the internal volume of the blower housing;
   a motor configured to rotate the blower wheel in a first direction around a central axis;
   a preswirler arranged within the inlet upstream of the blower wheel and including a plurality of vanes extending towards the blower wheel;
   wherein each vane of the plurality of vanes includes a first section and a second section, both extending along the central axis toward the blower wheel, with the second section being closer to the blower wheel than the first section is, wherein each vane of the plurality of vanes slope in a second direction as they extend along the central axis towards the blower wheel, the second direction being opposite to the first direction.

2. The blower device according to claim 1, wherein the first section extends parallel to the central axis.

3. The blower device according to claim 1, wherein the second section extends along a curve.

4. The blower device according to claim 1, wherein the second section extends along an arch with radius between 10 and 20 mm.

5. The blower device according to claim 1, wherein the number of blower blades is uneven.

6. The blower device according to claim 1, wherein the number of vanes within the plurality of vanes is uneven.

7. The blower device according to claim 1, wherein the number of blower blades is between 5 and 41.

8. The blower device according to claim 1, wherein the number of vanes within the plurality of vanes is between 5 and 19.

9. The blower device according to claim 1, wherein the preswirler includes a core from which each vane of the plurality of vanes radially extend, the core being hollowed so that air from the inlet can travel through the core to the blower wheel in addition to flowing around the core.

10. The blower device according to claim 9, wherein the core is a tube with a radius measuring between 10 and 40 mm degrees.

11. The blower device according to claim 1, wherein the inlet is constituted by a wall, with each vane of the plurality of vanes extending from the wall.

12. The blower device according to claim 1, wherein the first section of each vane of the plurality of vanes extends along the central axis for a distance measuring between 1 and 35 mm.

13. The blower device according to claim 1, wherein the second section of each vane of the plurality of vanes extends along the central axis for a distance measuring between 1 and 45 mm.

14. The blower device according to claim 1, wherein the second section of each vane of the plurality of vanes extends perpendicularly from the central axis for a distance measuring between 1 and 15 mm.

15. The blower device according to claim 1, wherein each vane of the plurality of vanes extends along respective extension axis extending radially from central axis for a distance measuring between 20 and 100 mm.

16. The blower device according to claim 1, wherein the blower wheel includes blower core from which the blower blades extend.

17. The blower device according to claim 16, wherein the blower core is in form of a cone with an apex pierced by the central axis, and a side surface extending between the apex and the blower blades.

18. The blower device according to claim 1, wherein each vane of the plurality of vanes measures between X and Y along the central axis.

19. The blower device according to claim 1, wherein the blower blades extend for a distance along the central axis, the distance measuring between 30 and 85 mm.

* * * * *

UNITED STATES PATENT AND TRADEMARK OFFICE
CERTIFICATE OF CORRECTION

| | | |
|---|---|---|
| PATENT NO. | : 12,392,354 B2 | Page 1 of 1 |
| APPLICATION NO. | : 18/540001 | |
| DATED | : August 19, 2025 | |
| INVENTOR(S) | : Cody Barnebee et al. | |

It is certified that error appears in the above-identified patent and that said Letters Patent is hereby corrected as shown below:

In the Claims

Column 6, Line 29 Claim 10, replace, ". . . measuring between 10 and 40 mm degrees." with
-- . . . measuring between 10 and 40 mm. --

Signed and Sealed this
Sixteenth Day of September, 2025

Coke Morgan Stewart
*Acting Director of the United States Patent and Trademark Office*